US012613013B2

(12) United States Patent
Miny et al.

(10) Patent No.: US 12,613,013 B2
(45) Date of Patent: Apr. 28, 2026

(54) HYDROGEN COMPRESSOR

(71) Applicant: Siemens Energy Global GmbH & Co. KG, Munich (DE)

(72) Inventors: Kevin Miny, Essen (DE); Matthias Meyer-Glitza, Moers (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/836,021

(22) PCT Filed: Jan. 9, 2023

(86) PCT No.: PCT/EP2023/050285
§ 371 (c)(1),
(2) Date: Aug. 6, 2024

(87) PCT Pub. No.: WO2023/147958
PCT Pub. Date: Aug. 10, 2023

(65) Prior Publication Data
US 2025/0155088 A1 May 15, 2025

(30) Foreign Application Priority Data
Feb. 7, 2022 (EP) .................................... 22155337

(51) Int. Cl.
*F17D 1/07* (2006.01)
*F04B 37/18* (2006.01)
(Continued)

(52) U.S. Cl.
CPC ................ *F17D 1/07* (2013.01); *F04B 37/18* (2013.01); *F04B 41/06* (2013.01); *F04C 23/005* (2013.01);
(Continued)

(58) Field of Classification Search
CPC .... F17D 1/07; F04C 23/005; F04C 2210/224; F04B 37/18; F04B 41/06; F04D 25/163
(Continued)

(56) References Cited

U.S. PATENT DOCUMENTS 3,355,096 A * 11/1967 Hornschuch ........ F04D 29/5826 415/179
4,077,743 A * 3/1978 Cochrane ............ F04D 27/0207 417/53
(Continued)

FOREIGN PATENT DOCUMENTS

DE 10302764 A1 7/2004
DE 102011015464 A1 5/2012
(Continued)

OTHER PUBLICATIONS

European Search Report; International Application No. 22155337.3; International Filing Date:Jul. 15, 2022; Date of mailing: Jul. 26, 2022; 9 pages.
(Continued)

*Primary Examiner* — Minh Q Le
(74) *Attorney, Agent, or Firm* — Cantor Colburn LLP; Georg Nemec

(57) ABSTRACT

The invention relates to a compression arrangement for compressing hydrogen, having at least eight compressors of a first type which, on the inlet side, are fluidically connected to a hydrogen inlet line, at least two compressors of a second type which, on the inlet side, are fluidically connected to the outlet of the compressors of the first type, at least one compressor of a third type which, on the inlet side, is fluidically connected to the outlet of the compressors of the second type, at least one compressor of a fourth type which, on the inlet side, is fluidically connected to the outlet of the compressor of the third type.

14 Claims, 4 Drawing Sheets

(51) Int. Cl.
*F04B 41/06* (2006.01)
*F04C 23/00* (2006.01)
*F04D 25/16* (2006.01)

(52) U.S. Cl.
CPC ...... *F04C 2210/224* (2013.01); *F04D 25/163* (2013.01)

(58) Field of Classification Search
USPC ........................................................ 137/565.3
See application file for complete search history.

(56) References Cited

U.S. PATENT DOCUMENTS

| | | | | | |
|---|---|---|---|---|---|
| 5,382,132 | A * | 1/1995 | Mendel | F04D 25/028 | 415/60 |
| 7,033,142 | B2 | 4/2006 | Conrad et al. | | |
| 11,821,424 | B2 * | 11/2023 | Miyata | F04C 18/084 | |
| 2009/0220357 | A1 * | 9/2009 | Baumer | F04B 41/06 | 417/244 |
| 2010/0111713 | A1 * | 5/2010 | Chatfield | F04B 27/005 | 417/533 |
| 2012/0100015 | A1 * | 4/2012 | Kim | F04D 29/5826 | 417/244 |
| 2013/0058761 | A1 * | 3/2013 | Nass | F04D 25/163 | 415/122.1 |
| 2014/0161588 | A1 * | 6/2014 | Miyata | F04D 17/12 | 415/17 |
| 2016/0115963 | A1 * | 4/2016 | Kempter | F04D 25/02 | 417/374 |
| 2016/0131155 | A1 * | 5/2016 | Miyata | F04D 29/051 | 415/124.2 |
| 2016/0186764 | A1 * | 6/2016 | Lissoni | F04D 17/122 | 417/423.1 |
| 2017/0198704 | A1 * | 7/2017 | Nakagawa | F04B 49/106 | |
| 2017/0276215 | A1 * | 9/2017 | Zimmermann | F04D 25/163 | |
| 2017/0356451 | A1 * | 12/2017 | Bresciani | F25J 3/04024 | |
| 2018/0017154 | A1 * | 1/2018 | Metz | F16H 57/045 | |
| 2018/0283389 | A1 * | 10/2018 | Fujioka | F04D 29/056 | |
| 2020/0392901 | A1 * | 12/2020 | Kim | F04D 17/105 | |
| 2021/0003127 | A1 * | 1/2021 | Merheim | F04B 41/06 | |
| 2022/0243736 | A1 * | 8/2022 | Miyata | F04D 17/12 | |
| 2022/0307512 | A1 * | 9/2022 | Miyata | F04D 25/163 | |
| 2022/0413523 | A1 * | 12/2022 | Yan | B01D 53/263 | |
| 2023/0167822 | A1 * | 6/2023 | Shaw | F04B 41/06 | 310/58 |
| 2023/0175517 | A1 * | 6/2023 | Miyata | F04D 25/163 | 417/374 |
| 2023/0314048 | A1 * | 10/2023 | Legay | F04C 29/028 | 62/510 |
| 2023/0392603 | A1 * | 12/2023 | Vandewal | F04D 17/12 | |
| 2024/0035480 | A1 * | 2/2024 | Maier | F04D 25/163 | |
| 2024/0151222 | A1 * | 5/2024 | Krumm | F04B 53/164 | |
| 2024/0209866 | A1 * | 6/2024 | Cangioli | F04D 25/068 | |

FOREIGN PATENT DOCUMENTS

| | | | |
|---|---|---|---|
| DE | 202012012359 | U1 | 3/2014 |
| WO | 2023147958 | A1 | 8/2023 |

OTHER PUBLICATIONS

PCT International Search Report and Written Opinion of International Searching Authority mailed Mar. 28, 2023 corresponding to PCT International Application No. PCT/EP2023/050285 filed Jan. 9, 2023: 15 pages.

* cited by examiner

HYDROGEN COMPRESSOR

BACKGROUND

The invention relates to a compression arrangement for compressing hydrogen, comprising a first number of compressors of a first type, wherein the compressors of the first type each have a first inflow region, which are designed to be flowed into by a first partial inlet volume flow, wherein the compressors of the first type each have a first outflow region, which are designed to be flowed out of by a first partial outflow volume flow, further comprising a compressor of a second type, wherein the compressor of the second type has a second inflow region which is designed to be flowed into by a second partial inlet volume flow, wherein the compressor of the second type has a second outflow region which is designed to be flowed out of by a second partial outflow volume flow, wherein the second inflow region of the compressor of the second type is fluidically connected to the first outflow regions of the compressors of the first type.

The hydrogen density in the atmospheric state is very low at about 90 $g/m^3$. It is therefore necessary to compress hydrogen in order to achieve a usable energy density.

However, the efficient compression of hydrogen is a technical challenge owing to the low molar weight. Here, depending on the compression ratio, numerous compressor stages are required which require intermediate cooling systems and have to be accommodated in a correspondingly large number of compressor housings. This results in a multiplicity of trains with a correspondingly large number of drive motors and intermediate gearings.

Proceeding from the known problems and disadvantages of the prior art, the object of the invention is to specify an installation and a method by means of which a cost advantage can be achieved.

SUMMARY

The object is achieved by means of a compression arrangement for compressing hydrogen, comprising a first number of compressors of a first type, wherein the compressors of the first type each have a first inflow region, which are designed to be flowed into by a first partial inlet volume flow, wherein the compressors of the first type each have a first outflow region, which are designed to be flowed out of by a first partial outflow volume flow, further comprising a compressor of a second type, wherein the compressor of the second type has a second inflow region which is designed to be flowed into by a second partial inlet volume flow, wherein the compressor of the second type has a second outflow region which is designed to be flowed out of by a second partial outflow volume flow, wherein the second inflow region of the compressor of the second type is fluidically connected to the first outflow regions of the compressors of the first type, wherein the number and the pressure ratio of the compressors of the first type and of the second type is such that the sum of the first partial outflow volume flows corresponds to the first partial inlet volume flow.

In one embodiment, the compression arrangement is designed as compactly as possible in order to thereby minimize the use of drive motors and housings. For this purpose, the volume flow is kept as constant as possible and the losses as low as possible. For this purpose, the compressors are interconnected in a cascade, the number of compressor housings decreasing with increasing pressure ratio.

Depending on the pressure ratio across a housing, a correspondingly large number of volume flows are brought together, the sum of the partial volume flows again corresponding to the original input volume flow. The housings are arranged in the space in such a way that they can both be provided with corresponding pipework and be operated with only a single drive. To this end, a gearbox with multiple drive ends is required, as is also used in geared compressors.

In one embodiment, the compressors of the first type, the compressors of the second type, the compressors of the third type and the compressors of the fourth type differ with regard to their pressure ratio. It is thus possible for the compressors to be configured in an optimized manner in order to fulfill the compression task.

In one embodiment, the compressors of the first type are of structurally identical embodiment.

In the context of the invention, a structurally identical embodiment should be understood to mean that the production, assembly and physical compression task for the individual compressors of the first type are virtually identical. Such a uniform design of the compressors of the first type saves costs since individual adaptations are negligible.

In one embodiment, the compressors of the second type are of structurally identical embodiment.

In the context of the invention, a structurally identical embodiment should be understood to mean that the production, assembly and physical compression task for the individual compressors of the second type are virtually identical. Such a uniform design of the compressors of the second type saves costs since individual adaptations are negligible.

In one embodiment, the compressors of the first type, the compressors of the second type, the compressors of the third type and/or the compressors of the fourth type are of multi-stage embodiment.

This makes it possible to optimize the compression task of each individual compressor.

In one embodiment, a cooling arrangement for cooling the flow medium is arranged between the output of a compressor of the first type and the input of a compressor of the second type, wherein a cooling arrangement for cooling the flow medium is arranged between the output of a compressor of the second type and the input of a compressor of the third type, and/or wherein a cooling arrangement for cooling the flow medium is arranged between the output of a compressor of the third type and the input of a compressor of the fourth type.

In one embodiment, the compression arrangement comprises a geared compressor having a bull gear and multiple planet gears, wherein the compressors of the first type are coupled in a torque-transmitting manner to a first planet gear and to a second planet gear, wherein the compressors of the second type are coupled in a torque-transmitting manner to a third planet gear, wherein the compressors of the third type and the compressors of the fourth type are coupled in a torque-transmitting manner to a fourth planet gear.

This makes it possible in particular to use merely one drive unit, in order to thereby save costs.

In one embodiment, at the first planet gear, four compressors of the first type are arranged along a first axle, wherein, at the second planet gear, four compressors of the first type are arranged along a second axle, wherein in each case two compressors of the first type are arranged on each side of the first planet gear and the second planet gear.

In one embodiment, the concept of cascading is pursued. The compressors of the first type are arranged in a space-saving and cost-saving manner as a result.

The compression arrangement has a comparatively high number of identical housings, and therefore the costs can be lowered with the aid of repeat parts.

The above-described properties, features and advantages of this invention, and the manner in which these are achieved, will become clearer and easier to understand in conjunction with the following description of exemplary embodiments, which will be discussed in more detail in conjunction with the drawings.

Identical components or components of identical function are denoted by the same reference designations.

BRIEF DESCRIPTION OF THE DRAWINGS

Exemplary embodiments of the invention will be described below on the basis of the drawings. The drawings are not intended to illustrate the exemplary embodiments to scale; rather, the drawings are of schematic and/or slightly distorted form where expedient for explanatory purposes. With regard to additions to the teaching that emerges directly from the drawing, reference is made to the relevant prior art.

In the drawings.

DETAILED DESCRIPTION

Figure 1:
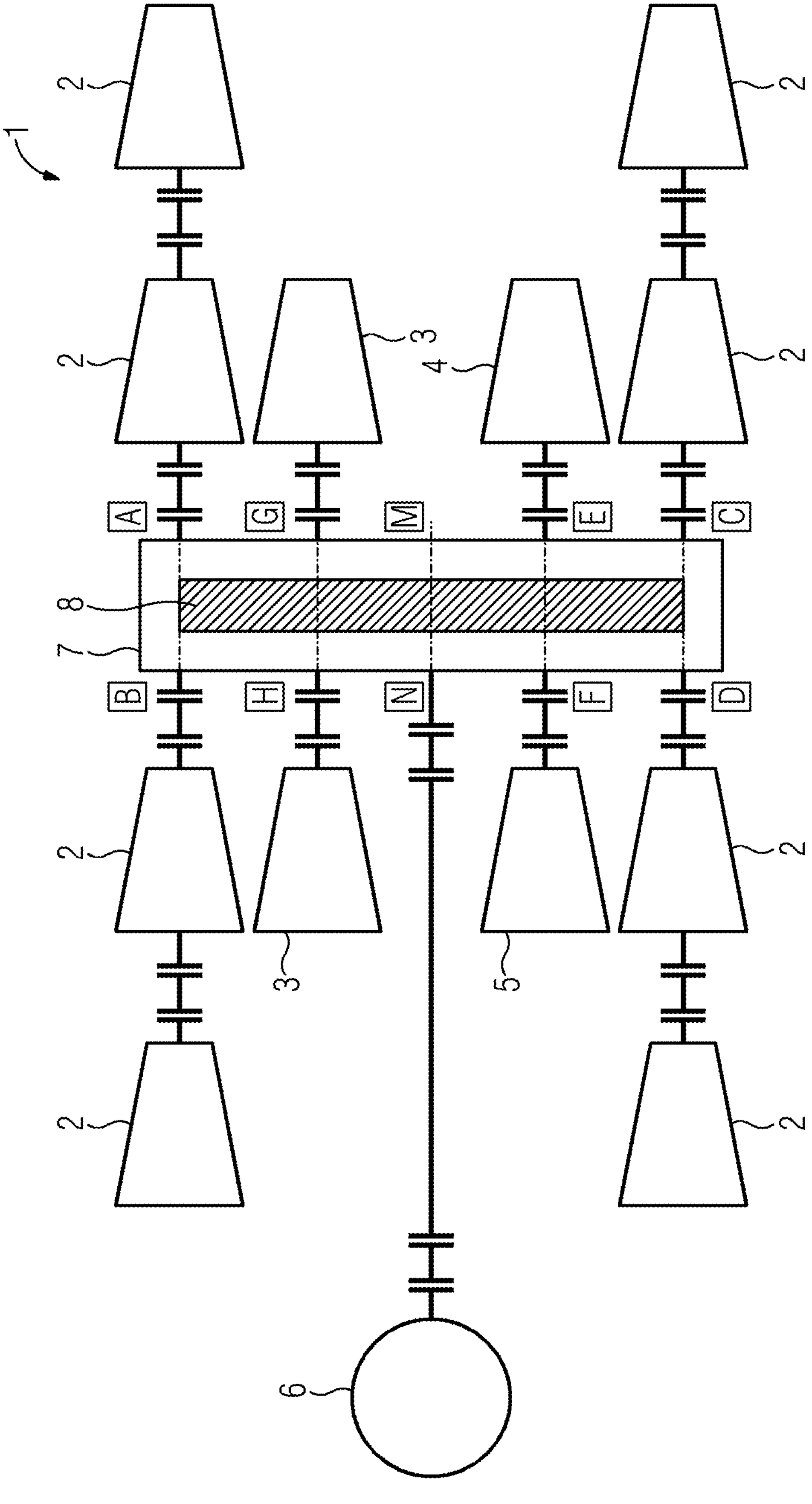
FIG. 1 shows a schematic illustration of the compression arrangement according to the invention.

FIG. 1 shows a schematic illustration of a compression arrangement 1 according to the invention. Such a compression arrangement 1 allows hydrogen to be compressed in a cost-effective manner. In this case, the compression of the hydrogen is carried out in the form of a cascade.

FIG. 1 shows a compression arrangement 1 for compressing hydrogen, comprising a first number of compressors of a first type 2, wherein the compressors of the first type 2 each have a first inflow region, which are designed to be flowed into by a first partial inlet volume flow, wherein the compressors of the first type 2 each have a first outflow region, which are designed to be flowed out of by a first partial outflow volume flow, further comprising a compressor of a second type 3, wherein the compressor of the second type 3 has a second inflow region which is designed to be flowed into by a second partial inlet volume flow, wherein the compressor of the second type 3 has a second outflow region which is designed to be flowed out of by a second partial outflow volume flow, wherein the second inflow region of the compressor of the second type 3 is fluidically connected to the first outflow regions of the compressors of the first type 2, wherein the number and the pressure ratio of the compressors of the first type 2 and of the second type 3 is such that the sum of the first partial outflow volume flow is corresponds to the first partial inlet volume flow.

To this end, the compression arrangement 1 for compressing hydrogen comprises at least eight compressors of a first type 2 which are fluidically connected on the input side to a hydrogen input line (not illustrated).

The compressor of the first type 2 is designed to transform a certain input pressure into an output pressure.

The hydrogen compressed in the compressors of the first type 2 is fed to a cooling arrangement (not illustrated), the temperature of the hydrogen that has been heated by the compression work in the compressor 2 being cooled again in the cooling arrangement.

After the hydrogen has been cooled in the cooling arrangement, it is fed to at least two compressors of a second type 3. The compressor of the second type 3 is likewise designed to transform a certain input pressure into an output pressure. However, here the pressure ratios differ from those of the compressor of type 1.

The two compressors of the second type 3 are fluidically connected on the input side to the output of the compressors of the first type 2.

The hydrogen compressed in the compressors of the second type 3 is fed to a further cooling arrangement (not illustrated), the temperature of the hydrogen that has been heated by the compression work in the compressor 3 being cooled again in the further cooling arrangement.

After the hydrogen has been cooled in the further cooling arrangement, it is fed to at least one compressor of a third type 4. The compressor of the third type 4 is likewise designed to transform a certain input pressure into an output pressure. However, here the pressure ratios differ from those of the compressor of the first type 2 and of the compressor of the second type 3.

The compressor of the third type 4 is thus fluidically connected on the input side to the output of the compressor of the second type 3.

The hydrogen compressed in the compressors of the third type 4 is fed to a further cooling arrangement (not illustrated), the temperature of the hydrogen that has been heated by the compression work in the compressor of the third type 4 being cooled again in the further cooling arrangement.

After the hydrogen has been cooled in the further cooling arrangement, it is fed to at least one compressor of a fourth type 5. The compressor of the fourth type 5 is likewise designed to transform a certain input pressure into an output pressure. However, here the pressure ratios differ from those of the compressor of the first type 2, of the compressor of the second type 3 and of the compressor of the third type 4.

The compressor of the fourth type 5 is fluidically connected on the input side to the output of the compressor of the third type 4.

The compressors of the first type 2 are of structurally identical embodiment. This means that all the compressors of the first type 2 installed in the compression arrangement 1 have the same dimensions, the same pressure ratios and have been produced by the same manufacturing method. This greatly reduces the costs for such a compression arrangement.

Similarly, the compressors of the second type 3 are of structurally identical embodiment. This means that all the compressors of the second type 3 installed in the compression arrangement 1 have the same dimensions, the same pressure ratios and have been produced by the same manufacturing method. This greatly reduces the costs for such a compression arrangement.

The compressors of the first type 2, the compressors of the second type 3, the compressors of the third type 4 and/or the compressors of the fourth type 5 are of multi-stage embodiment (not illustrated in FIG. 1).

The compressors of the first type 2, the compressors of the second type 3, the compressors of the third type 4 and the compressors of the fourth type 5 are coupled in a torque-transmitting manner to a drive unit 6.

To this end, the compression arrangement is formed with a geared compressor 7 having a bull gear 8 and multiple planet gears (not illustrated in FIG. 1).

As illustrated in FIG. 1, on one side of the bull gear 8, in each case two compressors of the first type 2 are arranged in a torque-transmitting manner at a planet gear, wherein an axle is formed.

The compressors of the second type 3 are arranged in a torque-transmitting manner at a planet gear, a respective compressor of the second type 3 being arranged on the one and on the other side of the bull gear.

The compressors of the third type 4 and of the fourth type 5 are arranged in a torque-transmitting manner at a planet gear, a compressor of the third type 4 being arranged on the one side of the bull gear and a compressor of the fourth type 5 being arranged on the other side of the bull gear.

Figure 2:
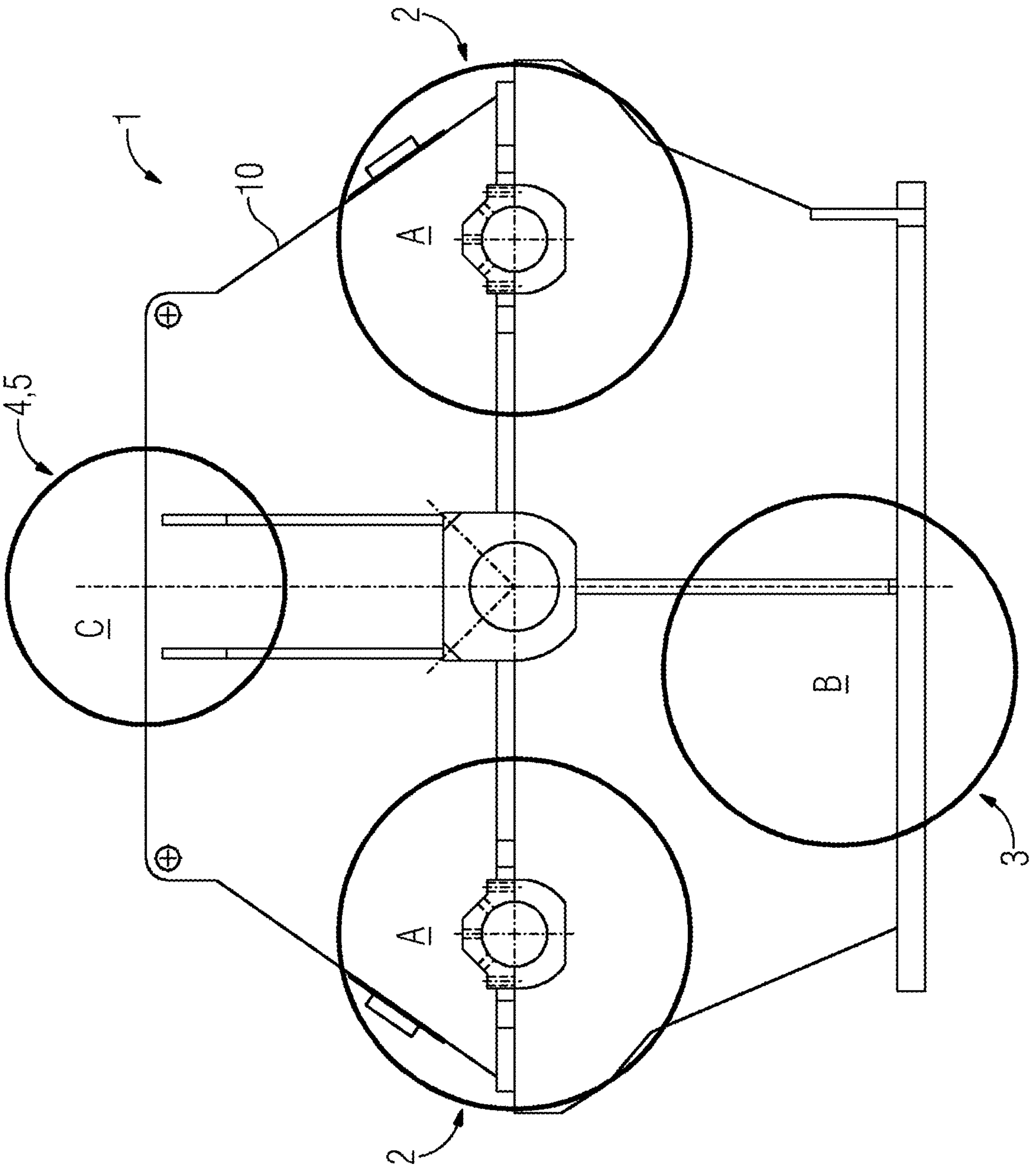
FIG. 2 shows a schematic side view of the compression arrangement.

FIG. 2 shows a schematic illustration of a lateral arrangement of the compression arrangement 1. The geared compressor is arranged in a housing 10. The planet gears driven by way of the bull gear 8 are illustrated symbolically by the letters A, B and C. In this case, the letter A is intended to represent the compression work of the compressors of the first type 2, the letter B the compression work of the compressors of the second type 3 and the letter C the compression work of the compressors of the third type 4 and the compressor of the fourth type 5.

Figure 3:
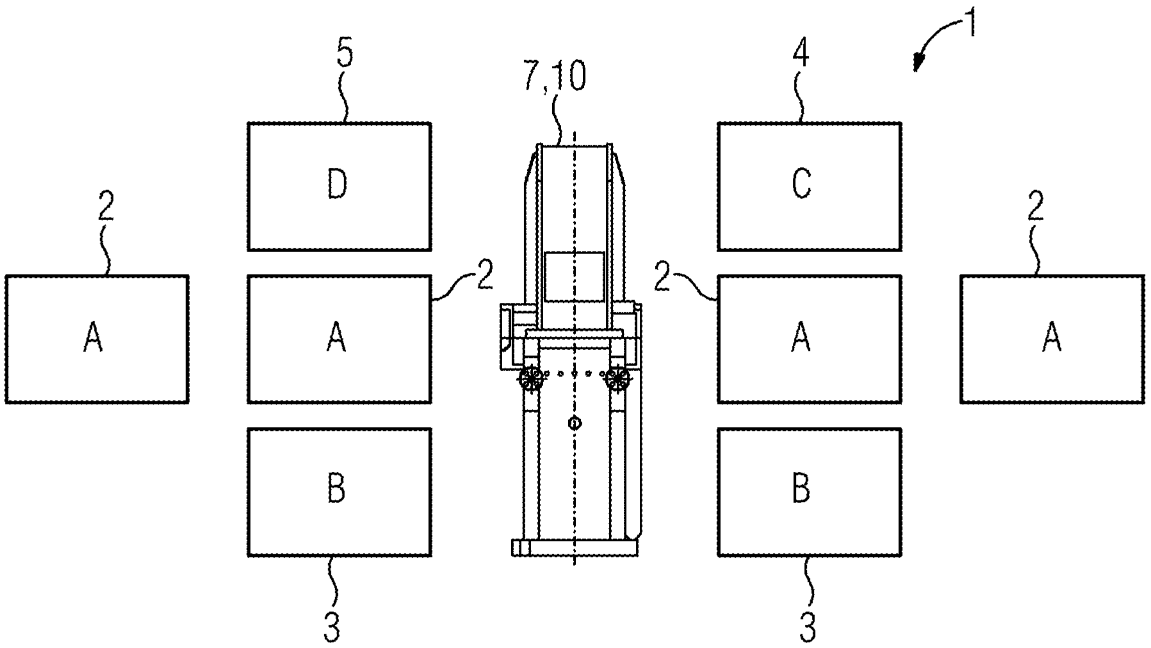
FIG. 3 shows a perspective illustration of a side view of the compression arrangement.
Figure 4:
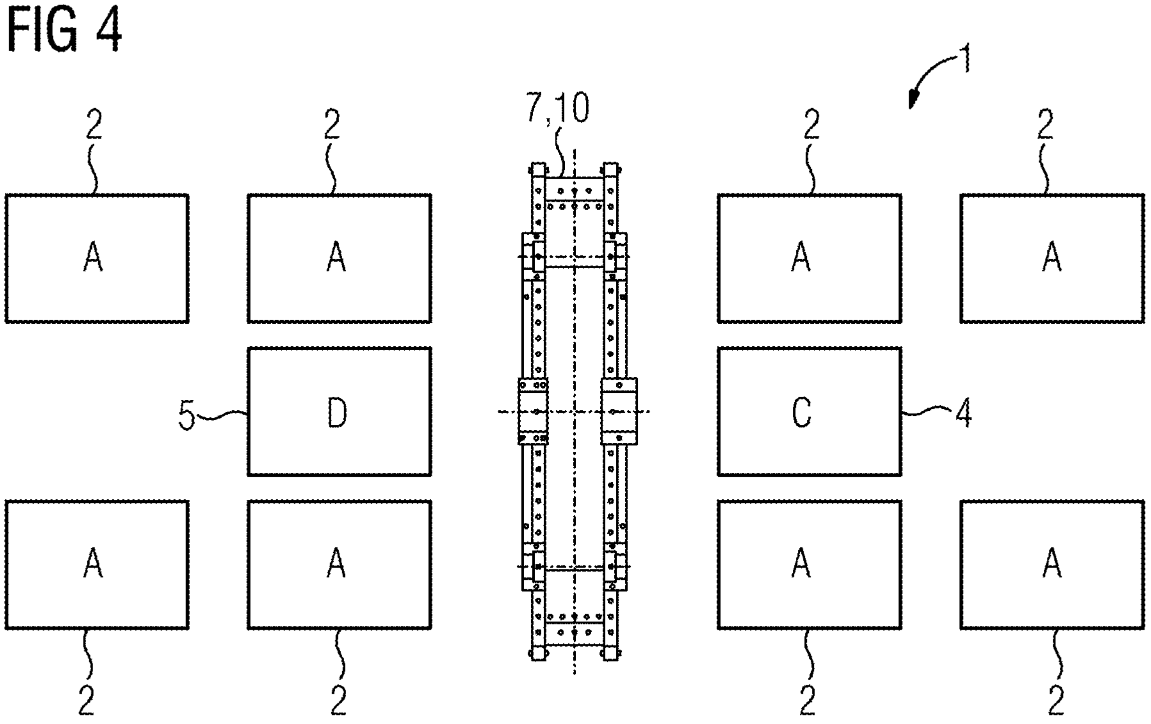
FIG. 4 shows a perspective illustration of a top view of the compression arrangement.

With FIGS. 3 and 4, the configuration according to the invention is intended to be described even more clearly. FIG. 3 shows a lateral view of the compression arrangement 1. FIG. 4 shows a view from above of the compression arrangement 1.

The letters A, B, C and D symbolize the individual compressors. A is intended to symbolize a compressor of the first type 2. B is intended to symbolize a compressor of the second type 3. C is intended to symbolize a compressor of the third type 4. D is intended to symbolize a compressor of the fourth type 5.

Figure 5:
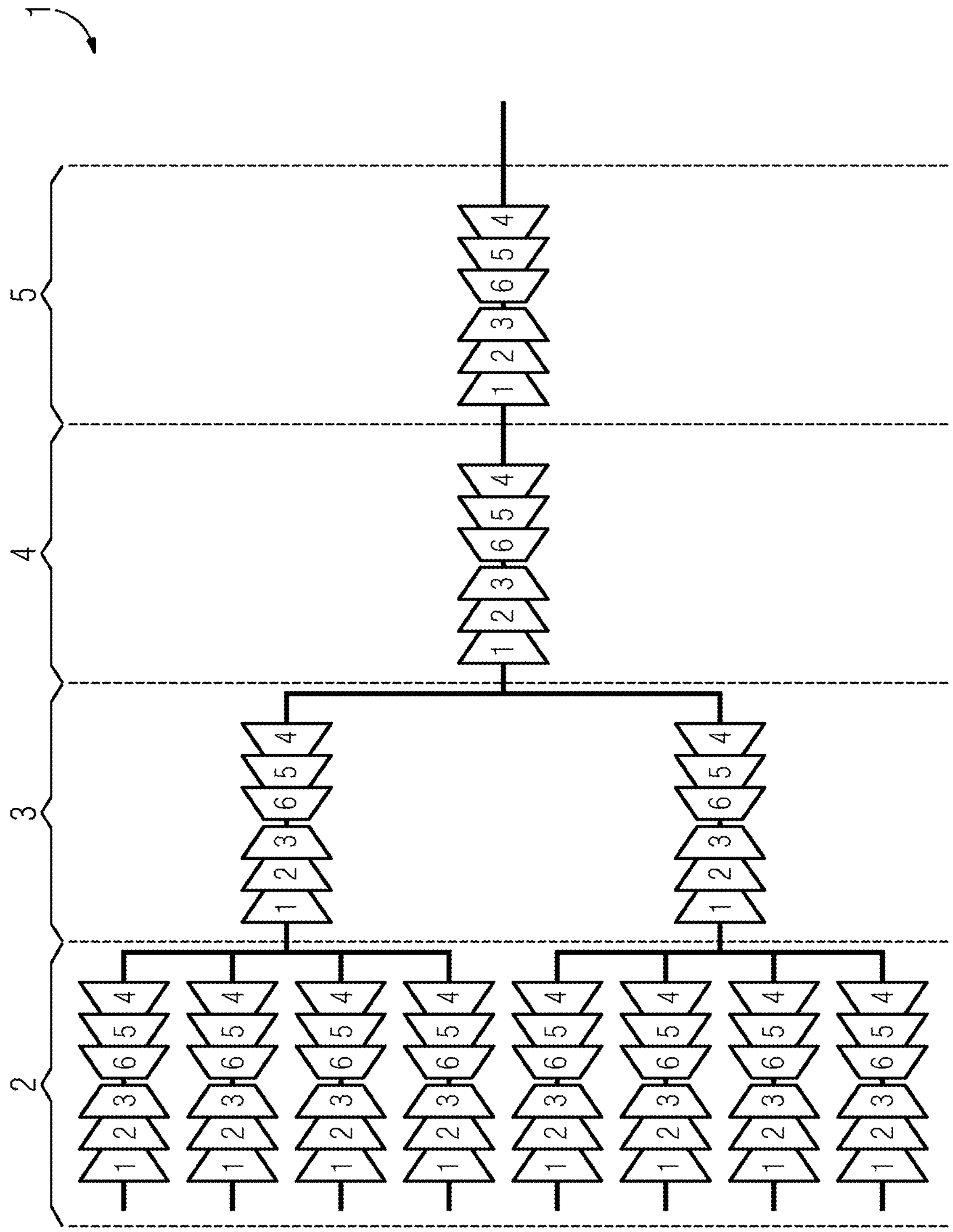
FIG. 5 shows a schematic illustration of the compression arrangement according to the invention.

FIG. 5 schematically illustrates how the compression process proceeds. The temporal sequence of the compression is effected from left to right. First, hydrogen is caused to flow into eight compressors of the first type 2 via a hydrogen input line, the hydrogen being compressed in the compressor of the first type 2. This is illustrated in FIG. 5 by the symbols in the first column.

After the compression in the compressors of the first type 2, further compression operations are effected in the compressors of the second type 3, in the compressor of the third type 4 and in the compressor of the fourth type 5. The numbers 1 to 6 symbolize that the compressors can be of multi-stage embodiment.

The invention claimed is:

1. A compression arrangement for compressing hydrogen, comprising:

a first number of compressors of a first type, wherein the compressors of the first type each have a first inflow region, which are designed to be flowed into by a first partial inlet volume flow, wherein the compressors of the first type each have a first outflow region, which are designed to be flowed out of by a first partial outflow volume flow;

and a second number of compressors of a second type, wherein the compressors of the second type each have a second inflow region which is designed to be flowed into by a second partial inlet volume flow, wherein the compressors of the second type each have a second outflow region which is designed to be flowed out of by a second partial outflow volume flow, wherein the second inflow regions of the compressors of the second type are fluidically connected to the first outflow regions of the compressors of the first type;

at least eight compressors of the first type, which are fluidically connected on an input side to a hydrogen input line;

at least two compressors of the second type, which are fluidically connected on the input side to an output of the compressors of the first type;

at least one compressor of a third type, which is fluidically connected on the input side to the output of the compressors of the second type; and at least one compressor of a fourth type, which is fluidically connected on the input side to the output of the compressor of the third type, wherein the compressors of the first type, the compressors of the second type, the compressors of the third type and the compressors of the fourth type differ with regard to their pressure ratio.

2. The compression arrangement as claimed in claim 1, wherein the compressors of the first type are of structurally identical embodiment.

3. The compression arrangement as claimed in claim 1, wherein the compressors of the first type and the compressors of the second type are of structurally identical embodiment.

4. The compression arrangement as claimed in claim 1, wherein the compressors of the first type are of structurally identical embodiment.

5. The compression arrangement as claimed in claim 1, wherein the compressors of the second type are of structurally identical embodiment.

6. The compression arrangement as claimed in claim 1, wherein the compressors of the first type, the compressors of the second type, the compressors of the third type and/or the compressors of the fourth type are of multi-stage embodiment.

7. The compression arrangement as claimed in claim 1, wherein a cooling arrangement for cooling a flow medium is arranged between an output of a compressor of the first type and an input of a compressor of the second type, wherein a cooling arrangement for cooling the flow medium is arranged between the output of a compressor of the second type and the input of a compressor of the third type, and wherein a cooling arrangement for cooling the flow medium is arranged between the output of a compressor of the third type and the input of a compressor of the fourth type.

8. The compression arrangement as claimed in claim 1, further comprising a geared compressor having a bull gear and multiple planet gears, wherein the compressors of the first type are coupled in a torque-transmitting manner to a first planet gear and to a second planet gear, wherein the compressors of the second type are coupled in a torque-transmitting manner to a third planet gear, and wherein the compressors of the third type and the compressors of the fourth type are coupled in a torque-transmitting manner to a fourth planet gear.

9. The compression arrangement as claimed in claim 8, wherein the first planet gear and the second planet gear are of structurally identical embodiment.

10. The compression arrangement as claimed in claim 8, wherein, at the first planet gear, four compressors of the first type are arranged along a first axle, wherein, at the second planet gear, four compressors of the first type are arranged along a second axle, and wherein in each case two compressors of the first type are arranged on each side of the first planet gear and the second planet gear.

11. The compression arrangement as claimed in claim 8, wherein in each case one compressor of the second type is arranged on each side of the third planet gear.

12. The compression arrangement as claimed in claim 8, wherein a compressor of the third type is arranged on the one side of the fourth planet gear and a compressor of the fourth type is arranged on the other side of the fourth planet gear.

13. The compression arrangement as claimed in claim 8, wherein the compressors of the first type, the compressors of the second type, the compressors of the third type and the compressors of the fourth type are coupled in a torque-transmitting manner to a drive unit.

14. The compression arrangement as claimed in claim 8, wherein the bull gear is coupled in a torque-transmitting manner to a drive unit.

* * * * *